United States Patent Office 3,442,896
Patented May 6, 1969

3,442,896
1,3-BIS(DIALKYLAMINOMETHOXY)-2,2,4,4-TETRAALKYLCYCLOBUTANES
Winston J. Jackson, Jr., and John R. Caldwell, Kingsport, Tenn., assignors to Eastman Kodak Company, Rochester, N.Y., a corporation of New Jersey
No Drawing. Filed May 2, 1966, Ser. No. 546,596
Int. Cl. C07c 93/12; C07d 87/40, 93/12
U.S. Cl. 260—246     9 Claims

ABSTRACT OF THE DISCLOSURE 1,3 - bis - (tertiaryaminomethoxy) - 2,2,4,4 - tetraalkyl cyclobutanes are manufactured by condensing a 2,2,4,4-tetraalkyl-cyclobutanediol with formaldehyde and thereafter reacting a secondary amine with the condensation product. The 1,4-bis-(tertiaryaminomethoxy) - 2,2,4,4-tetraalkylcyclobutanes are useful as polymerization catalysts.

---

This invention relates to novel cyclobutane derivatives and to their preparation. More particularly, it relates to a preparation of novel 1,3-bis-(tertiaryaminomethoxy)-2,2,4,4-tetraalkylcyclobutanes.

We have found that by treating 2,2,4,4-tetraalkyl-1,3-cyclobutanediols with formaldehyde in the presence of a suitable catalyst and thereafter adding a secondary amine, novel 1,3-bis(tertiaryaminomethoxy) - 2,2,4,4-tetraalkyl-cyclobutanes are obtained. While we prefer to carry out our reaction at atmospheric pressure, reduced or elevated pressures can be used. At least two moles of formaldehyde and at least two moles of amine should be used for each mole of diol.

The preparation of our novel compounds can be represented as follows:

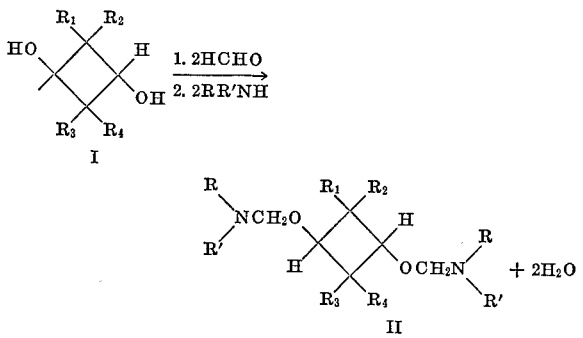

$R_1$, $R_2$, $R_3$ and $R_4$ can be (1) straight-chain and branched-chain alkyl radicals containing from 1 to 8 carbon atoms (for example, methyl, ethyl, propyl, isopropyl, butyl, hexyl, 2-ethylhexyl, octyl and the like), or (2) hydrocarbon radicals which together and with the adjoining carbon atom form a cyclopentane or cyclohexane ring. Representative diols containing the radicals of (2) have the following dispiro structures:

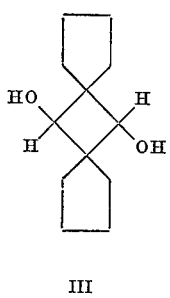
III

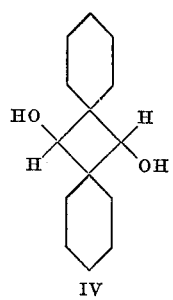
IV

For simplicity, it should be understood that we include such dispiro compounds in the term "tetraalkylcyclobutanes." R and R' may be (1) straight-chain and branched-chain alkyl radicals containing from 1 to 8 carbon atoms, (2) phenyl, or (3) radicals which together and with the adjoining —N form a piperidine, morpholine, thiamorpholine or pyrrolidene ring. Structures referred to in (3) include, for example,

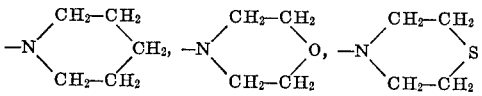
and

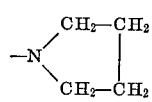

For simplicity, these cyclic radicals are included in the term "tertiaryaminomethoxy" as used herein.

The tetraalkylcyclobutanediol starting materials (I) are described in Hasek and Elam U.S. 2,936,324. Mixtures of the cis and trans forms from 100% cis to 100% trans can be used. Dispiro [4.1.4.1] dodecane-6,12-diol (III above) may be prepared as described in J. Org. Chem., 18, 702 (1953). Dispiro [5.1.5.1] tetradecane-7,14-diol (IV) may be prepared by reduction of the corresponding dione described in J. Am. Chem Soc., 75, 6339 (1953).

The novel 1,3-bis(tertiaryaminomethoxy)-2,2,4,4-tetra-alkylcyclobutanes can be prepared in accordance with our invention by (1) treating the tetraalkylcyclobutanediol with formaldehyde in the presence of a catalyst of the type illustrated hereinafter to form the intermediate dimethylol derivative and (2) thereafter adding the secondary amine to convert the intermediate to the desired product.

In a preferred embodiment of our novel method of preparation we have found that in a first reaction stage an intermediate dimethylol compound is found, which is a bishemiacetal of the following structure:

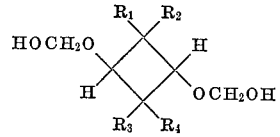

This intermediate compound can be isolated if desired. A side reaction apparently gives a methylenediamine:

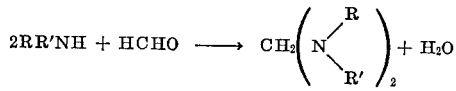

An advantage of our novel process is that the amount of this by-product which is formed is greatly reduced by preparation of the hemiacetal intermediate in the first reaction stage *before* addition of the amine in the subsequent reaction stage. Preferred reaction residence time is 1 to 6 hours for each stage. We have found that the hemiacetals from 2,2,4,4-tetraalkyl-1,3-cyclobutanediols are appreciably more stable than hemiacetals of aliphatic alcohols, which are relatively unstable.

The reaction is preferably carried out in a liquid inert medium which will not react with the diol, aldehyde or amine process reactants, for example, benzene, cyclohexane, heptane, dioxane, ethylene dichloride, or water. It is not necessary to dissolve the diol, which normally will be suspended in the medium in which the reaction is carried out. We prefer to use at least one gram of solvent for each three grams of reactants.

Aqueous formaldehyde or gaseous formaldehyde may be used. Paraformaldehyde is preferred as the formaldehyde source.

The reaction according to our invention is facilitated by an aprotic Lewis acid catalyst not readily hydrolized by water. Suitable catalysts of this type include, for example, zinc chloride, ferric chloride, and the like. Zinc chloride is preferred. Strongly acidic protonic catalysts such as sulphonic acids and mineral acids should not be used because they catalyze polyformal formation. Preferred catalyst concentration is from 0.1 to 5% based on the weight of the reactants. Reaction between diols and formaldehyde to give polyformals is described in Caldwell and Jackson U.S. Patent 2,968,646 and Advances in Chemistry Series, 34, 200 (1962).

When paraformaldehyde is the formaldehyde source, it is desirable to depolymerize the paraformaldehyde. This depolymerization is catalyzed by the Lewis acid catalyst, which also catalyzes the reaction between formaldehyde and the tetraalkylcyclobutanediol to form the dimethylol intermediate.

The preferred temperature for the first reaction stage is in the range of about 50 to 70° C. Higher temperature (up to about 100° C.) can be used although some loss of formaldehyde may occur. Lower temperature (down to about 20° C.) may be used with a progressively slower reaction as the temperature is decreased. After the dimethylol intermediate is obtained, the final condensation with the secondary amine is carried out at −10 to 100° C., preferably 10–30° C. The reaction is exothermic.

In another embodiment of our invention the reaction can be carried out by adding the secondary amine to a mixture of formaldehyde (or paraformaldehyde), diol and solvent.

The products of our invention are appreciably more resistant to hydrolysis than tertiaryaminomethoxy compounds obtained from other alcohols. For instance, our compounds derived from 2,2,4,4-tetramethyl-1,3-cyclobutanediol can be heated with water on a steam bath for an hour or more before solution occurs, indicating hydrolysis, whereas similar compounds obtained from aliphatic alcohols are rapidly hydrolyzed under these conditions [J. Chem. Soc., 119 1471 (1921)]. Our bis(dialkylaminomethoxy) derivatives from higher tetraalkylcyclobutanediols are more resistant to hydrolysis.

The following examples illustrate our invention.

EXAMPLE I 1,1′[2,2,4,4 - tetramethyl - 1,3 - cyclobutylenebis(oxymethylene)]dipiperidine.—A mixture containing 72 g. (0.50 mole) of 1/1 cis/trans-2,2,4,4-tetramethyl-1,3-cyclobutanediol, 31.5 g. of 95 percent paraformaldehyde (1.0 mole, calculated as formaldehyde), 0.25 g. of zinc chloride, and 150 ml. of benzene was stirred at 60° C. for 3 hrs. The solution was filtered while hot to remove a small amount of insoluble material. The filtrate was then cooled and 88 g. (1.05 mole) of piperidine in 50 ml. of benzene was slowly added at room temperature with stirring (exothermic reaction). After this solution was stirred for 3 hours, it was filtered from a small amount of insoluble material, washed with water several times, and dried with sodium sulfate. After the benzene was removed by distillation, some methylenedipiperazine was obtained which boiled at about 100° C./8 mm. The pressure was then decreased to 1 mm., but the product did not distill (base heater 170° C.). The yellow residual oil was the desired product. According to the nuclear magnetic resonance (NMR) and elemental analyses, it was substantially pure.

Analysis.—Calcd. for $C_{20}H_{38}N_2O_2$: C, 71.0; H, 11.2; N, 8.3. Found: C, 70.7; H, 11.1; N, 8.3.

A small portion of the product crystallized. The crystals, which were low-melting, were identified as the trans isomer by NMR spectrum.

EXAMPLE II 1,3-bis(dimethylaminomethoxy) - 2,2,4,4 - tetramethylcyclobutane.—This compound was prepared by the method of Example I, using dimethylamine instead of piperidine.

Analysis.—Calcd. for $C_{14}H_{30}N_2O_2$: C, 65.2; H, 11.6; N, 10.8. Found: C, 65.1; H, 11.8; N, 10.6.

EXAMPLE III 4,4′ - [2,2,4,4 - tetraethyl - 1,3 - cyclobutylenebis(oxymethylene)]dimorpholine.—This compound, a yellow oil, is obtained from 2,2,4,4-tetraethyl-1,3-cyclobutanediol and morpholine by the method of Example I.

EXAMPLE IV 1,3-bis(butylethylaminomethoxy) - 2,4 - dibutyl-2,4-diethylcyclobutane.—This compound, a yellow oil, is obtained from 2,4-dibutyl - 2,4 - diethyl-1,3-cyclobutanediol and butylethylamine by the method of Example I.

EXAMPLE V 6,12 - bis(methylphenylaminomethoxy)dispiro[4.1.4.1]-dodecane.—This compound, a yellow oil, is obtained from dispiro[4.1.4.1]dodecane-6,12-diol (III) and N-methylaniline by the method of Example I. The diol can be prepared as described in J. Org. Chem., 18, 702 (1953).

EXAMPLE VI 7,14 - bis(dibutylaminomethoxy)dispiro[5.1.5.1]tetradecane.—This compound is obtained from dispiro-[5.1.5.1]tetradecane-7,14-diol (IV) and dibutylamine by the method of Example I. The diol can be prepared from the corresponding dione, described in J. Am. Chem. Soc., 75, 6339 (1953), by reduction with lithium aluminum hydride [J. Org. Chem., 18, 702 (1953)].

EXAMPLE VII

The following additional 1,3 - bis(dialkylaminomethoxy)-2,2,4,4-tetraalkyl cyclobutanes are prepared using the method of Example I.

1,1′-[2,2,4,4-tetramethyl-1,3-cyclobutylene bis(oxymethylene)]dipyrrolidine
1,1′-[2,2,4,4-tetramethyl-1,3-cyclobutylene bis(oxymethylene)]dithiamorpholine
1,3-bis(dioctylaminomethoxy) - 2,2,4,4 - tetraethylcyclobutane

EXAMPLE VIII

The piperidine/tetramethylcyclobutanediol derivative of Example I was tested and found to have activity in vitrochemotherapy and as an antiinflammatory agent.

The compounds of this invention are useful as polymerization catalysts for several classes of polymers. Beta-lactones, for instance, are readily polymerized when heated with a catalytic amount of our novel diamino compounds. When pivalolactone is heated on a steam bath for 2 hours with 0.3 percent by weight of a 1,3-bis(dialkylaminomethoxy)-2,2,4,4-tetraalkylcyclobutane of our invention, a high polymer with an inherent viscosity of 0.6–1.5 is obtained. Polylactones are described in J. Polymer Science, part C, No. 4, 1061–74 (1963).

The curing of epoxy resins is catalyzed by our diamino compounds. Epoxy resins (such as Epon 834 or Epon 1004 from Shell Chemical Co.) become rapidly bonded to metals (steel, aluminum, copper, bronze, tin) when a thin coating of resin containing 1–3 percent by weight of our diamino compounds is heated for 1–2 hours at 110° C. The thin coating is conveniently applied by dipping the metal part into a methylene chloride solution containing the epoxy resin and catalyst and allowing the solvent to evaporate. Coatings of other polymers (polycarbonates, vinyl polymers, etc.) can then be applied similarly, and the cured epoxy resin will bond the polymer to the metal. This process, of particular value in bonding polycarbonate insulation to copper wire, is described in our patent application Ser. No. 175,290, filed Feb. 23, 1962, now United States Patent 3,258, 356. Also described in this application is another process in which our new compounds can be used as catalysts, whereby the polycarbonate, epoxy resin, and catalyst dissolved in a solvent are coated on metallic objects and then cured.

A further reaction which is catalyzed by our diamino compounds is that between isocyanates and compounds containing active hydrogen atoms. Of particular value are polyurethane foams, obtained by heating a mixture of diisocyanate, polyol, and 1–3 percent by weight of our catalyst at 80° C. for about 10 minutes.

We claim:

1. A compound having the formula

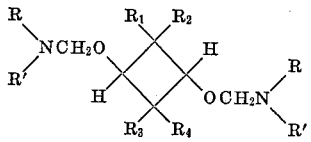

wherein $R_1$, $R_2$, $R_3$ and $R_4$ are (1) straight-chain or branched-chain alkyl radicals of 1 to 8 carbon atoms or (2) hydrocarbon radicals which together and with the adjoining carbon atoms form a cyclopentane or cyclohexane ring, and R and R' are (1) straight-chain or branched-chain alkyl radicals of 1 to 8 carbon atoms, (2) phenyl, or (3) radicals which together and with the adjoining —N< form a piperidine, morpholine, thiamorpholine or pyrrolidine ring.

2. A compound of claim 1 in which the compound is 1,1'-[2,2,4,4-tetramethyl-1,3-cyclobutylenebis(oxymethylene)]dipiperidine.

3. A compound of claim 1 in which the compound is 1,3-bis(dimethylaminomethoxy)-2,2,4,4-tetramethylcyclobutane.

4. A compound of claim 1 in which the compound is 4,4'-[2,2,4,4-tetraethyl-1,3-cyclobutylenebis(oxymethylene)]dimorpholine.

5. A compound of claim 1 in which the compound is 1,3-bis(butylethylaminomethoxy)-2,4-dibutyl-2,4-diethylcyclobutane.

6. A process for preparation of a 1,3-bis(dialkylaminomethoxy)-2,2,4,4-tetraalkylcyclobutane which comprises (1) reacting a 2,2,4,4-tetraalkyl-1,3-cyclobutanediol with formaldehyde in the presence of an aprotic Lewis acid catalyst to provide an intermediate dimethylol hemiacetal and (2) thereafter adding a secondary amine RR'NH in which R and R' are (a) straight or branched-chain hydrocarbon radicals containing 1 to 8 carbons, (b) phenyl, or (c) radicals which together and with the adjoining —N< form a piperidine, morpholine, thiamorpholine or pyrrolidine ring, thereby converting the intermediate dimethylol hemiacetal to the 1,3-bis(tertiaryaminomethoxy)-2,2,4,4-tetraalkylcyclobutane.

7. The process of claim 6 wherein R and R' are (1) a straight- or branched-chain alkyl radical of 1–8 carbons, (2) phenyl, or (3) a radical which together and with the adjoining —N< forms a piperidine, morpholine, thiamorpholine or pyrrolidine ring, and the alkyl group of the tetraalkyl is (1) a straight-chain or branched-chain alkyl radical of 1–8 carbons, or (2) a hydrocarbon radical which together and with the adjoining carbon forms a cyclopentane or cyclohexane ring.

8. The process of claim 6 wherein 1/1 cis/trans-2,2,4,4-tetramethyl-1,3-cyclobutanediol is reacted with paraformaldehyde and piperidine in the presence of zinc chloride to form 1,1'-[2,2,4,4-tetramethyl-1,3-cyclobutylenebis(oxymethylene)]dipiperidine.

9. The process of claim 6 wherein 1/1 cis/trans-2,2,4,4-tetramethyl-1,3-cyclobutanediol is reacted with paraformaldehyde and dimethylamine in the presence of zinc chloride to form 1,3-bis(dimethylaminomethoxy)-2,2,4,4-tetramethylcyclobutane.

OTHER REFERENCES

Jackson et al.: C. A. vol. 57, p. 13, 947i, (1962).

ALEX MAZEL, Primary Examiner.

J. TOVAR, Assistant Examiner.

U.S. Cl. X.R.

117—161; 260—2.5, 47, 243, 294.7, 326.5, 563, 999